United States Patent [19]
Bauer et al.

[11] 3,938,495
[45] Feb. 17, 1976

[54] GRILLING APPARATUS WITH SUPPORTING SURFACE

[75] Inventor: Hans Bauer, Dettingen, Germany

[73] Assignees: Hans Bauer, Dettingen, Germany; Fa. Dietz-Druekguss KG, Unterensingen, both of Germany

[22] Filed: Sept. 11, 1974

[21] Appl. No.: 505,001

[30] Foreign Application Priority Data
Sept. 14, 1973  Germany............................ 7333356

[52] U.S. Cl. .............................. 126/41 R; 126/25 R
[51] Int. Cl.² ...................... A47J 37/00; F24B 3/00
[58] Field of Search ......... 126/41 R, 38, 39 J, 39 K, 126/39 C, 25 R; 99/446, 447, 339, 422

[56] References Cited
UNITED STATES PATENTS

| | | | |
|---|---|---|---|
| 1,936,551 | 11/1933 | Garrison | 99/339 |
| 2,026,286 | 12/1935 | Samuels | 99/422 |
| 2,746,377 | 5/1956 | Parks | 126/25 R X |
| 3,520,290 | 7/1970 | Winters | 126/25 R |
| 3,693,534 | 9/1972 | Martin | 99/446 X |
| 3,757,675 | 9/1973 | Wilbrichy | 99/446 |

FOREIGN PATENTS OR APPLICATIONS
407,130  12/1924  Germany........................... 126/39 C Primary Examiner—William F. O'Dea
Assistant Examiner—Harold Joyce

[57] ABSTRACT

A grilling apparatus with a grilling tub which is provided with a support surface and a heating arrangement, which can be covered by a hood, and which is used for the grilling of foods. The instant invention provides an addition to the known grilling apparatus which allows, besides the grilling of the foods, also to bake the same and therefore make it possible to achieve a further utilization and optimal usage of the grilling apparatus. The grilling tub, above the heating arrangement, is provided with a bowl that has a closed bottom surface. This bowl can, in an advantageous manufacturing form, according to the invention, have indentations of a waffle-formed structure on the side that is facing away from the heating arrangement.

3 Claims, 3 Drawing Figures

GRILLING APPARATUS WITH SUPPORTING SURFACE

This invention relates to a grilling apparatus with a grilling tub which is provided with a food supporting surface and a heating arrangement, which can be covered by a hood, and which is used for the grilling of foods such as sausages, steaks, chickens, etc. In known grilling apparatuses, the grilling tub has, on its upper open side, a grilling grate and a heat retaining grate on which the foods to be grilled are placed. The heat is thereby primarily led to the foods in the form of rays, directly from the heating arrangement to the surface of the being grilled product and conducting it to the inside while cooking it.

With a variety of foods as, for example, pizzas, corn on the cob, tomatoes, etc., it is desirable to bring them to a rather high temperature for cooking, so as to achieve a rather fast cooking process.

It is therefore the object of the instant invention to improve the known grilling apparatuses so as to allow it, besides grilling foods, also to bake the same and therefore make it possible to achieve a further utilization and optimal usage of the grilling apparatus.

In the grill of the present invention, the grilling tub, above the heating arrangement, is provided with a bowl that has a closed bottom surface. This bowl can, in an advantageous manufacturing form according to the invention, have indentations of a waffle-formed structure on the side that is facing away from the heating arrangement.

When using the grilling apparatus of the invention, the foods to be grilled are put upon the grilling grate and the foods to be baked are put into the bowl. The heating arrangement not only feeds rays over the heating surface which reaches the foods to be grilled, but there is also created a rising heat flow from the heating arrangement which heats the bowl from the bottom and cooks the foods therein in a relatively short time. Since the grilling tub is more or less covered by the hood, the whole grilling apparatus serves as a form of baking oven.

Furthermore, the bowl makes it possible, when using grease to fry several foods as, for example meats, so that again a fast cooking is achieved by direct contact of the food with the bottom surface. In view of the waffle-like structure of the bottom surface, the heat is led into the product to be cooked through the existing contact surface. Furthermore, it is possible to heat water in the bowl.

According to the invention, the bowl has furthermore a front plate extending downwardly into the bottom surface and on the opposite side a sloped back plate, so that, on the one hand, the heating surface of the heating arrangement is protected from dripping fat by the front plate, and, on the other hand, the sloped back plate leads the rising heat flow from the heating arrangement under the hood, which transfers this heat flow onto the foods that are put on the grilling grate.

An example of the invention is illustrated in the drawings and is herein further described:

Figure 1:
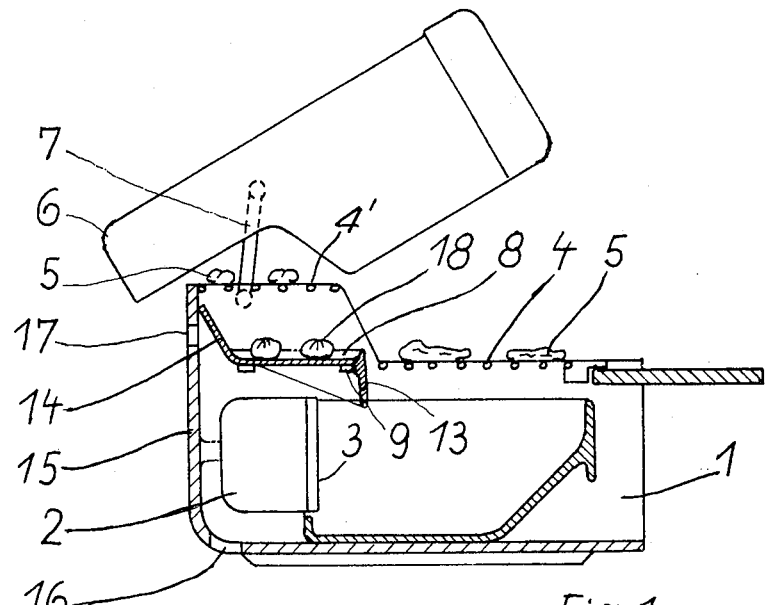
FIG. 1 shows the whole grilling apparatus in partial section.
Figure 2:
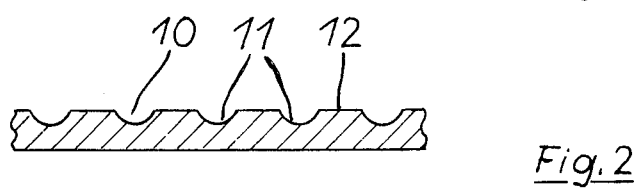
FIG. 2 is an enlarged view in cross-section through a part of the bowl according to FIG. 1.
Figure 3:
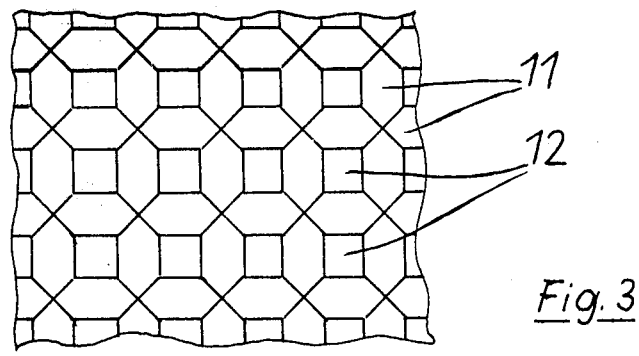
FIG. 3 is an enlarged top view of a part of the bottom surface of the bowl according to FIG. 1.

As is shown in FIG. 1, the grilling apparatus consists of a grilling tub 1, in which a heating arrangement 2, preferably an infrared gas-emitter, is connected with a heating surface 3. On the upper, open side of the grilling tub 1, a main grilling grate 4 and an upper warming grate 4' are fastened for supporting foods 5. This upper, open side of the grilling tub 1 can be covered by a hood 6, which is connected to the grilling tub 1 by hinge-brackets 7.

In the grilling tub at a certain distance above the heating arrangement 2 there is affixed a bowl 8 by rest supports 9, so that it can easily be removed from the grilling tub.

The bottom surface 10 of the bowl 8 is provided with a pattern of indentations 11, so that a waffle-like structure with raised contact surface 12 is created.

On the front side, the bowl 8 is provided with a front plate 13, which extends downwardly over the bottom surface in such a way that the interspace between the bowl 8 and the heating arrangement 2 is completely covered. On the opposite side of the front plate the bowl is provided with a sloped back plate 14, which when the bowl is in inserted position, reaches to the back wall 15 of the grilling tub 1. This back wall 15 is interrupted by air inlet openings 16 and air exit openings 17.

When using the grilling apparatus of the present invention, the foods 5 to be grilled are put upon the grilling grates 4, and the foods 18 to be baked are put into the bowl 8. The heating arrangement 2 radiates radiation heat from the heating surface 3 upon the foods 5 to be grilled. The necessary air for burning is sucked into the grilling tub by the air inlet openings 16 and creates a heat flow upwardly which warms the bowl 8 from the bottom and is led out again by the back plate 14 through the air exit openings 17 out of the grilling tub 1. Thereby the heat rises again upwardly and reaches the inside of the hood 6, which in the position illustrated in FIG. 1, extends backwardly over the back wall 15 of the grilling tub 1. Heat is again transferred thereby to the grilling and warming foods 5 as well as to the foods 18 to be baked, and achieves a fast cooking of these foods.

By the use of a bowl in a grilling apparatus it is possible, through the utilization of the secondary heat created by the heating arrangement 2, to grill as well as cook in the same apparatus, and thereby open up further methods of application. Since the bowl 8 can easily be removed from the grilling tub 1, it can easily be cleaned and maintained.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a grilling apparatus, a grill tub containing a heating element, a grilling element supported transversely to and above the heating element and forwardly thereof, a bowl have a closed, food supporting bottom surface exhibiting a pattern of indentations and mounted independently, directly above the heating element and transverse to the grilling element, the bottom surface of the bowl being directly heated by a first portion of the radiation from the heating element, means for deflecting a second portion of the radiation from the heating element toward the grilling element, a hood adjustably positioned above the grill tub for deflecting radiation incident thereon downwardly toward the bowl, and means including an aperture in one wall of the grill tub for directing a flow of heated air from the heating element toward the hood.

2. Grilling apparatus according to claim 1, wherein the bowl has a front plate extending downwardly over the bottom surface of the bowl for deflecting drippings away from the heating element, the bowl having a sloped back plate on the opposite side for guiding the third portion of the radiation from the heating element.

3. Grilling apparatus according to claim 1, wherein the bowl is removably affixed in the grilling tub.

* * * * *